STIVER & WILLIAMS.
Broiler.
No. 104,075. Patented June 7, 1870.
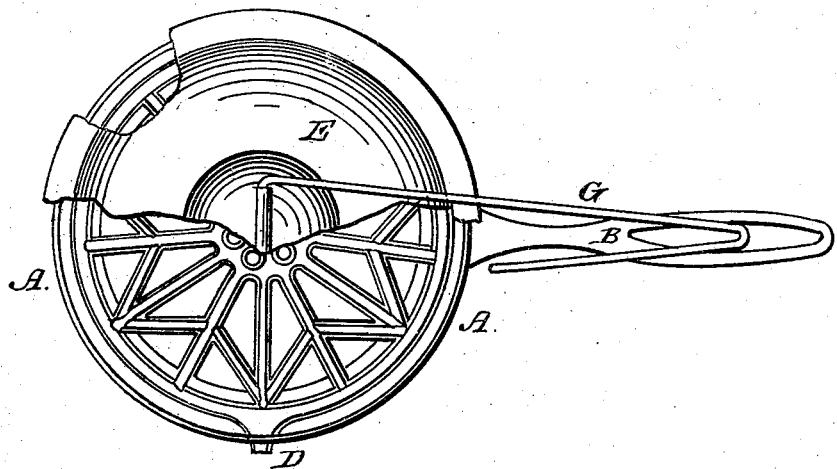
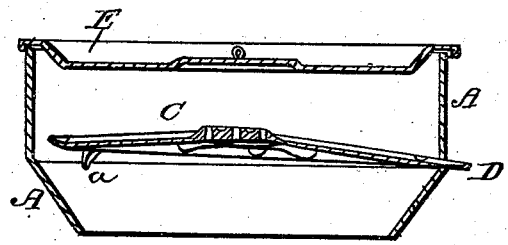

United States Patent Office.

WILLIAM C. STIVER AND JOHN S. WILLIAMS, OF BROOKLYN, NEW YORK.

Letters Patent No. 104,075, dated June 7, 1870.

BROILER.

The Schedule referred to in these Letters Patent and making part of the same

*To all whom it may concern:*

Be it known that we, WILLIAM C. STIVER and JOHN S. WILLIAMS, of the city of Brooklyn, in the county of Kings and in the State of New York, have invented certain new and useful Improvements in Broilers; and do hereby declare that the following is a full, clear, and exact description thereof, reference being had to the accompanying drawing and to the letters of reference marked thereon, making a part of this specification.

The nature of our invention consists in the construction and arrangement of a "broiler," as will be hereinafter fully set forth.

In order to enable others skilled in the art to which our invention appertains to make and use the same, we will now proceed to describe its construction and operation, referring to the annexed drawing, in which—

Figure 1 is a plan view, and

Figure 2 is a longitudinal vertical section of our broiler.

A represents the pan or body of our broiler, provided with a handle, B, and open both at top and bottom. The sides of the upper half of the pan A are vertical, while the sides of the lower half are contracted toward the lower end, that is, they are inclined inward and downward, making the lower edge of the pan smaller than the center and top.

Within the pan A is placed a grate, C, provided with feet *a a*, which rest upon the inclined sides of the pan. This grate may be of any suitable design, and provided, on its upper surface, with grooves, for the purpose of catching the gravy, and conveying it out through a spout, D, which forms a part of the grate, and projects through an opening in the side of the pan A.

On top of the pan A is laid a cover, E, provided with a long handle, G, as shown in fig. 1.

By this arrangement of the broiler the meat is more tender than any other mode of cooking, at the same time preserving all the flavor, sweetness, and juice of the meat, without any smell or smoke in the room. The gravy runs out without being burned.

Having thus fully described our invention,

What we claim as new, and desire to secure by Letters Patent, is—

The grate C, constructed as shown, with a series of grooved bars radiating from the center to a circumferentially-grooved bar, having feet *a*, and spout D, in combination with the pan A, inclined inward at its lower part, and provided with an opening for the spout, all substantially as set forth.

In testimony that we claim the foregoing, we have hereunto set our hands, this 22d day of March, 1870.

WILLIAM C. STIVER.
      JOHN S. WILLIAMS.

Witnesses:
 JOHN CURTIS,
 WILLIAM MACKEY.